United States Patent [19]

Homma et al.

[11] 3,928,565
[45] Dec. 23, 1975

[54] PHARMACEUTICAL PREPARATION OF PSEUDOMONAS AERUGINOSA BACTERIAL COMPONENT POSSESSING ANTI-TUMOR AND ANTI-INFECTION PROPERTIES

[75] Inventors: Yuzuru Homma; Chiyoji Abe, both of Tokyo; Hiroshi Shionoya, Niiza, all of Japan

[73] Assignees: Yuzuru Homma; Chiyoji Abe; Hiroshi Shionoya, all of Japan

[22] Filed: Dec. 4, 1972

[21] Appl. No.: 312,212

Related U.S. Application Data

[62] Division of Ser. No. 190,536, Oct. 19, 1971.

[52] U.S. Cl. .................................................. 424/92
[51] Int. Cl. ............................................. A61k 23/00
[58] Field of Search .................................... 424/92

[56] References Cited
FOREIGN PATENTS OR APPLICATIONS
45-6038  2/1970  Japan ................................. 424/92

OTHER PUBLICATIONS
Homma et al., Journal of Bacteriology, Vol. 87, pp. 630–640, Mar. 1964.
Homma et al., Annals of the N. Y. Academy of Sciences, Vol. 133, pp. 508–526, 1966.

*Primary Examiner*—Richard L. Huff
*Attorney, Agent, or Firm*—Wenderoth, Lind & Ponack

[57] ABSTRACT

Anti-tumor and vaccine preparations comprising cell wall protein component of Pseudomonas aeruginosa as active ingredient and a pharmaceutically acceptable carrier. The preparations are suitable for parenteral administration for the therapeutical treatment of patients and animals suffering from tumors including cancer as well as phophylactic treatment of disease caused by infection of Pseudomonas aeruginosa. The cell wall protein component is characterized by the fact that the same exhibits a high anti-tumor effect with low toxicity and without type-specificity to the variety of antigens of Pseudomonas aeruginosa.

2 Claims, 1 Drawing Figure

EFFECT OF CWP AGAINST SARCOMA 180A

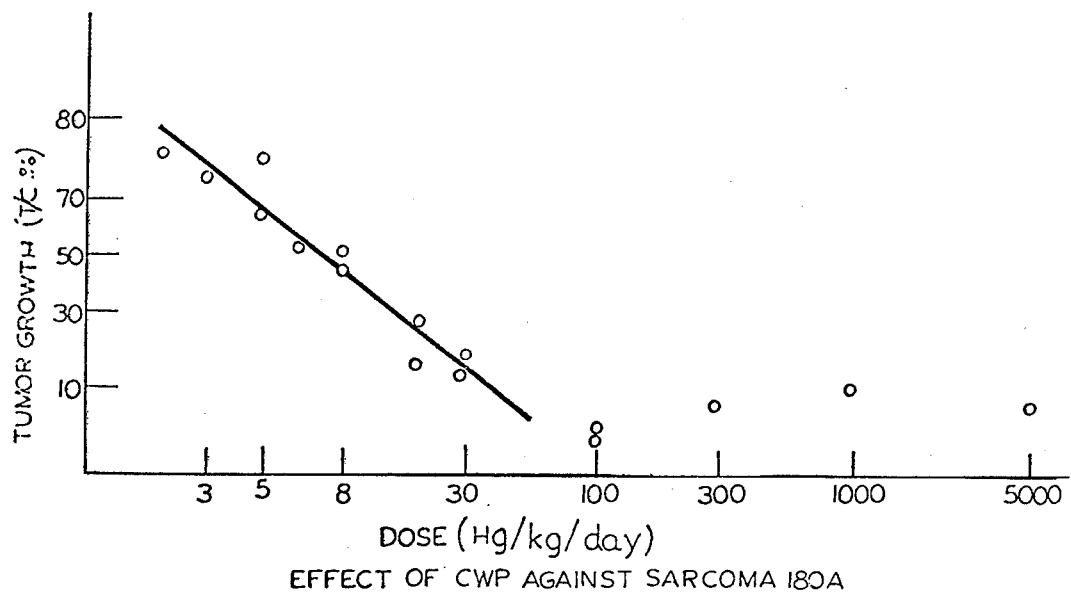
EFFECT OF CWP AGAINST SARCOMA 180A

PHARMACEUTICAL PREPARATION OF PSEUDOMONAS AERUGINOSA BACTERIAL COMPONENT POSSESSING ANTI-TUMOR AND ANTI-INFECTION PROPERTIES

This is a division of application Ser. No. 190,536, filed Oct. 19, 1971.

This invention relates to the pharmaceutical preparation comprising a cell wall component of *Pseudomonas aeruginosa* and a pharmaceutically acceptable carrier. More particularly, the present invention relates to the pharmaceutical composition comprising a cell wall protein component of *Pseudomonas aeruginosa* hereinafter called CWP and a pharmaceutical carrier, which is effective for inhibiting growth of tumors in animals including man and for immunizing them against infection of *Pseudomonas aeruginosa*.

Accordingly, one object of the present invention is to provide the anti-tumor and vaccine composition in dosage unit form comprising CWP and a pharmaceutical carrier.

Another object of the present invention is to provide a method for preventing growth of tumors in animals and humans and also a method for immunizing them from infection of *Pseudomonas aeruginosa* by parenteral administration of CWP.

CWP which had first been isolated by J. Y. Homma et al. is a protein antigen existing as a cell wall component of *Pseudomonas aeruginosa* and is also called Original Endotoxin Protein. [J. Y. Homma; J. Bacteriol. 89, pp. 630–640, 1964; Ann. New York Acad. Sci. 133, pp. 508–526, 1966; Zeitschrift fur Allg. Mikrobiol. 8, pp. 227–248, 1968.]

The field of tumor therapy has recently been well studied. However, very few effective anti-tumor agents have been found which control the growth of tumors without causing serious side-effects in the patient.

Now the present inventors have found that parenteral administration of CWP to tumor-bearing animals inhibits the growth of the tumors.

CWP of the present invention exhibits a strong inhibiting activity against tumors caused by Sarcoma 180 ascites (S-180A) and Ehrlich ascites carcinoma (EAC), the both have usually been employed as a standard for screening anti-tumor substances.

Since most of the known anti-cancer agents employed clinically at present are effective for restraining the growth of tumors caused by S-180A and/or EAC, it follows that CWP is also effective for therapeutical treatment of patient suffering from cancer.

Because *Pseudomonas aeruginosa*, as it is known, is generally of a natural resistance against usual antibiotics, most of the known antibiotics are ineffective for therapeutical treatment or prevention of disease caused by the infection of *Pseudomonas aeruginosa*.

Amongst bacterial components of *Pseudomonas aeruginosa*, use of Lipopolysaccharide-protein complex (LPS) as a vaccine of *Pseudomonas aeruginosa* is already known. However, the immunizing effect of LPS, as is known, is type specific. LPS vaccine therefore exhibits a selective protection activity only against infection of *Pseudomonas aeruginosa* having the particular Sero-type. The fact is a decisive drawback encountered in the prevention and treatment of disease caused by infection of *Pseudomonas aeruginosa*.

Now the present inventors have found that CWP is an excellent antigen to *Pseudomonas aeruginosa*. It is notable that CWP has almost no type-specificity and exhibits, independent of Sero-type of the bacterium, remarkable effects in therapeutical treatment and in prevention of the infective disease caused by *Pseudomonas aeruginosa*.

Additional advantage of CWP, when administered is its low toxicity and low pyrogenesis that are in a level of about 1/10 of those caused by administration of LPS. Accordingly, CWP is useful for the vaccine of *Pseudomonas aeruginosa*.

Chemical and physical characteristics of CWP vary in a certain extent depending upon sort of the bacterial strain of *Pseudomonas aeruginosa* employed for the production thereof.

In light-absorption spectrum, CWP shows the first peak at 275–280 nm wave length, the second peak at 410–415 nm and the third peak at 550 nm (weak). CWP contains 10–16% of nitrogen; less than 5% of sugars in the term of glucose according to Anthrone method; 0.03–1.7% of amino-sugars; and 0.3–2.0% of phosphorus. The substance belongs to an acid protein having isoelectric point at about pH 4.5 and is sparingly soluble in water and aqueous mineral acids while easily soluble in aqueous alkali. For instance, 1 mg of CWP is completely soluble in 0.1 ml of 1/100 n-NaOH.

In immunochemical study according to the agar gel diffusion test, it has been confirmed that CWP does not contain common antigen to that of LPS.

Therapeutical effect of CWP for preventing growth of tumors was inspected in the following experiment:

Groups each of six (6) mice were intraperitoneally inoculated with $1 \times 10^7$ cells of Sarcoma 180 ascites (S-180A) and of Ehrlich ascites carcinoma (EAC).

After 24 hours, CWP solutions in various concentrations in physiological saline were intraperitoneally administered once a day. The administration was successively continued for 5 days. Anti-tumor activity was judged by measuring the total packed cell volume (TPCV) in the ascites taken after 7 days from the tumor inoculation. The results were shown by the ratio T/C %, wherein "T" is the TPCV value obtained from the test groups, and "C" the TPCV value obtained from the control group which was treated only with the physiological saline.

The experiments gave the following results:

Against S-180A, 50% effective dose ($ED_{50}$) of CWP was 8.5 μg/kg body weight/day and 90% effective dose ($ED_{90}$) was 40 μg/kg body wt./day.

Against EAC, $ED_{50}$ of CWP was 8.0 μg/kg body wt./day and $ED_{90}$ was 35 μg/kg body wt./day.

After the 5-day's successive administrations of 5 mg/kg body wt./day of CWP, the mice resulted in a slight diminution of their body weight but no animal died. Accordingly, 10% lethal dose ($LD_{10}$) of CWP is greater than 5 mg/kg body wt./day at the 5-day's successive administrations. Thus, the therapeutical index ($LD_{10}/ED_{90}$) over 120 is given to CWP.

It has been found neither a substance which possesses anti-tumor activity effective with a minute amount, nor a substance which possesses an extremely large difference between the effective dose and the lethal dose comparable to that of CWP according to the present invention.

Acute toxicity ($LD_{50}$) of CWP to mouse, when administered intraperitoneally, was 37.5 mg/kg body weight.

The preparation according to the present invention may be provided in a form of vial or ampoule containing CWP in combination with a pharmaceutically acceptable carrier in dry state. As the pharmaceutical carrier, there may be used glucose, mannitol, carboxymethyl cellulose and the like.

The preparation when used may be dissolved in distilled water for injection or a physiological saline. The solution may be parenterally administered through intramuscular, subcutaneous and intraperitoneal routes. CWP may also be employed with the perfusion techniques.

For the purpose of immunizing man against *Pseudomonas aeruginosa*, it has been found that 3–5 administrations by subcutaneous, intramuscular or intraperitoneal injection of 1–100 μg/day of CWP at the interval of 2–3 days are desirable. For the purpose of therapeutical treatment of patient infected by *Pseudomonas aeruginosa*, administration of a CWP preparation of the present invention may, if necessary, be continued for more than one year without serious side-effects.

From the result observed in the animal test aforementioned, it is believed that parenteral administration of 5–300 μg of CWP is effective for inhibiting tumor-growth in man.

The following Examples serve to illustrate the invention.

EXAMPLE 1

Preparation of CWP

Dissociant strain, type 1a, of *Pseudomonas aeruginosa* N 10 was inoculated into 20 liters of the synthetic medium containing 0.5% of glycerol, 2% of sodium glutamate, 0.56% of $Na_2HPO_4.12H_2O$, 0.025% of $KH_2PO_4$, 0.019% of $MgSO_4.7H_2O$, 0.001% of $Ca(NO_3)_2$ and 0.000005% of $FeSO_4.7H_2O$.

Aerobic cultivation of the strain in the abovementioned medium was carried out at 37°C. by passing 0.2 liter of sterilized air per minute per liter of the medium, while pH of the medium was automatically adjusted to 7.4. When the growth entered into a stationary phase, the culture medium was incubated for additional 3 hours, and the incubation was then stopped.

A quantity of toluene was added to autolyse the culture medium. The autolysate was filtered on a filter paper. To the resulting filtrate was added 400 ml of an aqueous 50% zinc chloride solution. The resulting precipitate was recovered by centrifuge. To solubilize CWP, the precipitate was treated with a saturated aqueous solution of $Na_2HPO_4$ and centrifuged off. The supernatant liquor was dialysed against tap water. To the dialysed solution was added sodium acetate at the final concentration of 0.1%. At the temperature of 0.°C., six fold (v/v) acetone was added to the solution. The resulting precipitate was collected and dissolved into water. The aqueous solution was subjected to electrodialysis and then lyophilized.

The lyophilized substance was subjected to zone-electrophoresis using a polyvinyl chloride resin as the supporting material in a M/20 borate buffer solution of pH 8.8. As the result of separation, the substance was found to contain two components showing different mobilities under UV-absorption measurement at 280 nm. The fraction corresponding to one component thereof having the lower mobility was dialysed and then lyophilized. The lyophilized substance was dissolved into a 0.01M Tris-HCl buffer solution of pH 8.0 and subjected to a column chromatography on Sephadex G200. A main band thus obtained was collected and adsorbed on a column of DEAE cellulose which had previously been equilibrated with the buffer solution same as that aforementioned. The column was then eluted with the aqueous sodium chloride solutions by means of a gradient procedure.

The fraction eluted with 0.2–0.3M sodium chloride was dialysed and lyophilized. CWP was thus obtained at the yeild of 300 mg.

Chemical properties of CWP are as follows:

| N | 13.8% | |
|---|---|---|
| P | 1.1% | |
| Sugars | 0.01% | by Anthrone method |
| Amino-sugars | 0.03% | by Elson-Morgan method |
| Protein | 85% | by Folin-Ciocalteu method and amino-acid analysis |

A specimen of the bacterial strain of *Pseudomonas aeruginosa* N 10 used in the present invention has been deposited to The Bureau of American Type Culture Collection of U.S.A. under ATCC 21726.

EXAMPLE 2

Anti-tumor activity of CWP was inspected on female mice weighing 20 ± 2 g of D D N strain with respect to Sarcoma 180 ascites (S-180A) and of Ehrlich ascites carcinoma (EAC).

The mice were divided into the groups each 6 mice. To the mice of the groups were intraperitoneally transplanted the abovementioned tumor cells (1 × 10⁷ cells). After 24 hours, CWP solutions of the various concentrations in physiological saline were injected intraperitoneally once a day for 5 days to each mouse of the individual groups.

After 7 days from the transplantation, ascite was collected from each of the mice and the total packed cell volume (TPCV) contained therein was measured. The resulting TPCV was designated by percent (%) in comparison with TPCV of the control mice to which the physiological saline alone was injected (T/C %). The results obtained are graphically shown in the accompanying FIGURE.

The ordinate in the FIGURE shows Provit T/C % and the abscissa shows the log dose of CWP per kg body weight of the mice per day.

The FIGURE shows an almost liner correlation between the tumor growth inhibition and the dose of CWP. It is also found that $LD_{90}$ and $ED_{50}$ of CWP are 40 μg/kg body weight/day and 8.5 μg/kg body wt./day, respectively. When administered more than 100 μg/kg body wt./day of CWP, the data showed the existence of about 10% cells. It was confirmed that these cells were not the tumor cells but polymorphonucler leucocyte.

EXAMPLE 3

CWP obtained from the dissociant strain, type 1a, of *Pseudomonas aeruginosa* N 10 was employed in this test. 15 μg of CWP were subcutaneously injected to the respective male mice of D D N strain weighing 25 g in average. On 7th day after the injection, the mice were challenged with the suspensions of *Pseudomonas aeruginosa* N 10 in a 5% hog stomach mucin.

Similar challenge was carried out with *Pseudomonas aeruginosa* 703 which differs from the former with respect to the LPS Sero-type. The results are shown in the following Tables 1 and 2 wherein the numbers of

Table 1

| Strain used to challenge: | Pseudomonas aeruginosa N 10 (Sero-type 5) | | | | |
|---|---|---|---|---|---|
| | Numbers of bacterial cell in 0.5 ml of 0.5% mucin solution administered IP to immunized mice | | | | |
| | $1.5 \times 10^7$ | $1.5 \times 10^6$ | $1.5 \times 10^5$ | $1.5 \times 10^4$ | $1.5 \times 10^3$ |
| Immunized Groups: | 0/5 | 0/5 | 0/5 | 0/5 | 0/5 |
| Control: | 5/5 | 4/5 | 3/5 | 0/5 | 0/5 |

Table 2

| Strain used to challenge: | Pseudomonas aeruginosa 703 (Sero-type 12) | | | | |
|---|---|---|---|---|---|
| | Numbers of bacterial cell in 0.5 ml of 0.5% mucin solution administered IP to immunized mice | | | | |
| | $7.5 \times 10^7$ | $7.5 \times 10^6$ | $7.5 \times 10^5$ | $7.5 \times 10^4$ | $7.5 \times 10^3$ |
| Immunized Groups: | 4/4 | 4/4 | 1/4 | 0/4 | 0/4 |
| Control: | — | 2/2 | 4/4 | 4/4 | 0/3 | the challenged mice are in the denominators and the numbers of dead mice in the numerators.

From the above Tables, it is recognized that by immunizing with CWP obtained from *Pseudomonas aeruginosa* N 10, it is possible to protect the animals from the challenge of *Pseudomonas aeruginosa* 703 either which possesses LPS Sero-type different from that of the former N 10 strain.

What is claimed is:

1. A method for the treatment of infections caused by *Pseudomonas aeruginosa* which comprises parenterally administering to a human 1 - 100 μg/day of a cell wall protein component produced by aerobic cultivation in an aqueous medium of *Pseudomonas aeruginosa* and having the following properties:

ultraviolet absorption peaks at 275–280 nm, 410–415 nm, and 550 nm (weak);

analysis — 10–16% nitrogen, less than 5% sugars in terms of glucose, 0.03 to 1.7% amino sugars and 0.3 to 2.0% phosphorus;

isoelectric point at about pH 4.5, sparingly soluble in water and aqueous mineral acids, readily soluble in aqueous alkali.

2. A method according to claim 1 wherein the strain of *Pseudomonas aeruginosa* is ATCC 21726 having the analysis N — 13.8%
P — 1.1%
Sugars (as glucose) — 0.01%
Amino sugars — 0.3%
Protein — 85%.

* * * * *

UNITED STATES PATENT AND TRADEMARK OFFICE
CERTIFICATE OF CORRECTION

PATENT NO. : 3,928,565
DATED : December 23, 1975
INVENTOR(S) : Yuzuru Homma, Chiyoji Abe and Hiroshi Shionoya It is certified that error appears in the above-identified patent and that said Letters Patent are hereby corrected as shown below:

Claim 2, line 2, after "21726" insert -- , said cell wall protein component --;

line 7, change "0.3%" to -- 0.03% --.

*Signed and Sealed this*

*Second Day of November 1976*

[SEAL]

*Attest:*

RUTH C. MASON
*Attesting Officer*

C. MARSHALL DANN
*Commissioner of Patents and Trademarks*